United States Patent [19]
Hong

[11] Patent Number: 5,802,167
[45] Date of Patent: Sep. 1, 1998

[54] HANDS-FREE DEVICE FOR USE WITH A CELLULAR TELEPHONE IN A CAR TO PERMIT HANDS-FREE OPERATION OF THE CELLULAR TELEPHONE

[76] Inventor: Chu-Chai Hong, 2F, No. 83, Min-Chuan Rd., Hsin-Tien City, Taipei Hsien, Taiwan

[21] Appl. No.: 745,493

[22] Filed: Nov. 12, 1996

[51] Int. Cl.$^6$ ............................................ H04M 9/00
[52] U.S. Cl. .................. 379/388; 379/420; 455/90; 455/569
[58] Field of Search .................. 379/387, 388, 379/390, 395, 413, 419, 420, 428, 429, 432, 434, 440, 441, 442, 443; 455/90, 126, 127, 128, 569, 571, 572, 573, 575

[56] References Cited

U.S. PATENT DOCUMENTS

| | | | |
|---|---|---|---|
| 4,636,741 | 1/1987 | Mitzlaff | 455/127 |
| 4,745,632 | 5/1988 | Duffy | 455/550 |
| 4,811,390 | 3/1989 | Garabedian et al. | 379/390 |
| 4,905,270 | 2/1990 | Ono | 455/90 |
| 5,291,147 | 3/1994 | Muurinen | 455/126 |
| 5,303,395 | 4/1994 | Dayani | 455/127 |
| 5,333,176 | 7/1994 | Burke et al. | 455/90 |
| 5,367,556 | 11/1994 | Marui et al. | 379/432 |
| 5,444,867 | 8/1995 | Marui et al. | 455/127 |
| 5,493,703 | 2/1996 | Yamashita | 455/127 |
| 5,524,044 | 6/1996 | Takeda | 455/571 |
| 5,584,052 | 12/1996 | Gulau et al. | 455/90 |
| 5,590,414 | 12/1996 | Marui et al. | 455/90 |

Primary Examiner—Krista Zele
Assistant Examiner—Scott L. Weaver
Attorney, Agent, or Firm—Michael, Best & Friedrich LLP

[57] ABSTRACT

A hands-free device is adapted for use with a cellular telephone in a car to permit hands-free operation of the cellular telephone, and includes a main terminal, a secondary terminal, and a microphone provided on one of the main and secondary terminals. The main terminal includes a first casing, a power supplying unit, a voltage regulating circuit, a first connector, an audio output amplifier circuit, and a sound output unit. The secondary terminal includes a second casing, a second connector connected removably to the first connector, a third connector connected removably to the cellular telephone, a hands-free control circuit, a voltage output control circuit, and a gain control circuit. The secondary terminal can be replaced so that the hands-free device can be used with any type of cellular telephone without changing the main terminal.

11 Claims, 6 Drawing Sheets

HANDS-FREE DEVICE FOR USE WITH A CELLULAR TELEPHONE IN A CAR TO PERMIT HANDS-FREE OPERATION OF THE CELLULAR TELEPHONE

BACKGROUND OF THE INVENTION

1. Field of the Invention

The invention relates to a cellular telephone, more particularly to a hands-free device for use with a cellular telephone in a car to permit hands-free operation of the cellular telephone.

2. Description of the Related Art

Cellular telephones have increased in popularity in recent years in view of the many conveniences they provide. However, when used while driving a car, such telephones expose the driver to a greater risk of vehicular accidents.

In order to permit safe use of the cellular telephone while driving, a hands-free device which permits hands-free operation of the cellular telephone has been proposed. Referring to FIG. 1, the conventional hands-free device is shown to include a power supplying unit 10, a main terminal 11 and a connector 12. The power supplying unit 10, which is provided on the main terminal 11 and which is connected electrically to the same, is in the form of a plug that is adapted to be inserted into a lighter socket (not shown) of a car, thereby enabling the power supplying unit 10 to supply a stable voltage signal to the main terminal 11. The main terminal 11 includes a sound input unit and a sound output unit. The sound input unit includes an external microphone 13. The sound output unit includes a loudspeaker which is built into the main terminal 11. The connector 12 is connected electrically to the main terminal 11 and has a connector end that is adapted to be connected to the cellular telephone 14. As such, voice signals picked up by the external microphone 13 can be sent to the cellular telephone 14 via the main terminal 11, while audio signals received by the cellular telephone 14 can be received by the main terminal 11 for reproduction by the sound output unit.

Presently, there is a wide variety of cellular telephones available in the market. Usually, each type of cellular telephone requires a specific connector and a particular set of operating and control voltages. As such, although the conventional hands-free device permits safe use of a cellular telephone while driving, it is only adapted for use with a specific type of cellular telephone. This results in problems for the manufacturers of the conventional hands-free devices and in inconvenience for consumers.

SUMMARY OF THE INVENTION

The main object of the present invention is to provide a hands-free device for use with a cellular telephone in a car to permit hands-free operation of the cellular telephone, the hands-free device having a secondary terminal which can be replaced to suit the type of cellular telephone that is in use to simplify production and to facilitate maintenance of the hands-free device.

Accordingly, the hands-free device of this invention is adapted for use with a cellular telephone in a car to permit hands-free operation of the cellular telephone and comprises:

a main terminal including: a first casing; a power supplying unit provided on the first casing and adapted to be connected electrically to a power source of the car; a voltage regulating circuit disposed in the first casing and connected electrically to the power supplying unit so as to generate a stable voltage signal therefrom; a first connector provided on the first casing and connected electrically to the voltage regulating circuit so as to receive the voltage signal therefrom; an audio output amplifier circuit disposed in the first casing and connected electrically to the voltage regulating circuit so as to receive the voltage signal therefrom, the audio output amplifier circuit being further connected electrically to the first connector for amplifying an audio signal received by the first connector; and a sound output unit connected electrically to the audio output amplifier circuit for reproducing the audio signal from the audio output amplifier circuit;

a secondary terminal including: a second casing; a second connector provided on the second casing and connected removably to the first connector; a third connector provided on the second casing and adapted to connect removably with the cellular telephone; a hands-free control circuit disposed in the second casing and connected electrically to the third connector, the hands-free control circuit being adapted to control hands-free operation of the cellular telephone; a voltage output control circuit disposed in the second casing and connected electrically to the second and third connectors, the voltage output control circuit adjusting the voltage signal received by the first connector from the voltage regulating circuit and being adapted to provide the voltage signal to the cellular telephone via the third connector; and a gain control circuit disposed in the second casing and connected electrically to the second and third connectors, the gain control circuit being adapted to adjust level of the audio signal received from the cellular telephone via the third connector prior to supplying the audio signal to the audio output amplifier circuit via the first and second connectors; and a microphone provided on one of the main terminal and the secondary terminal for picking up voice signals to be supplied to the cellular telephone by the secondary terminal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
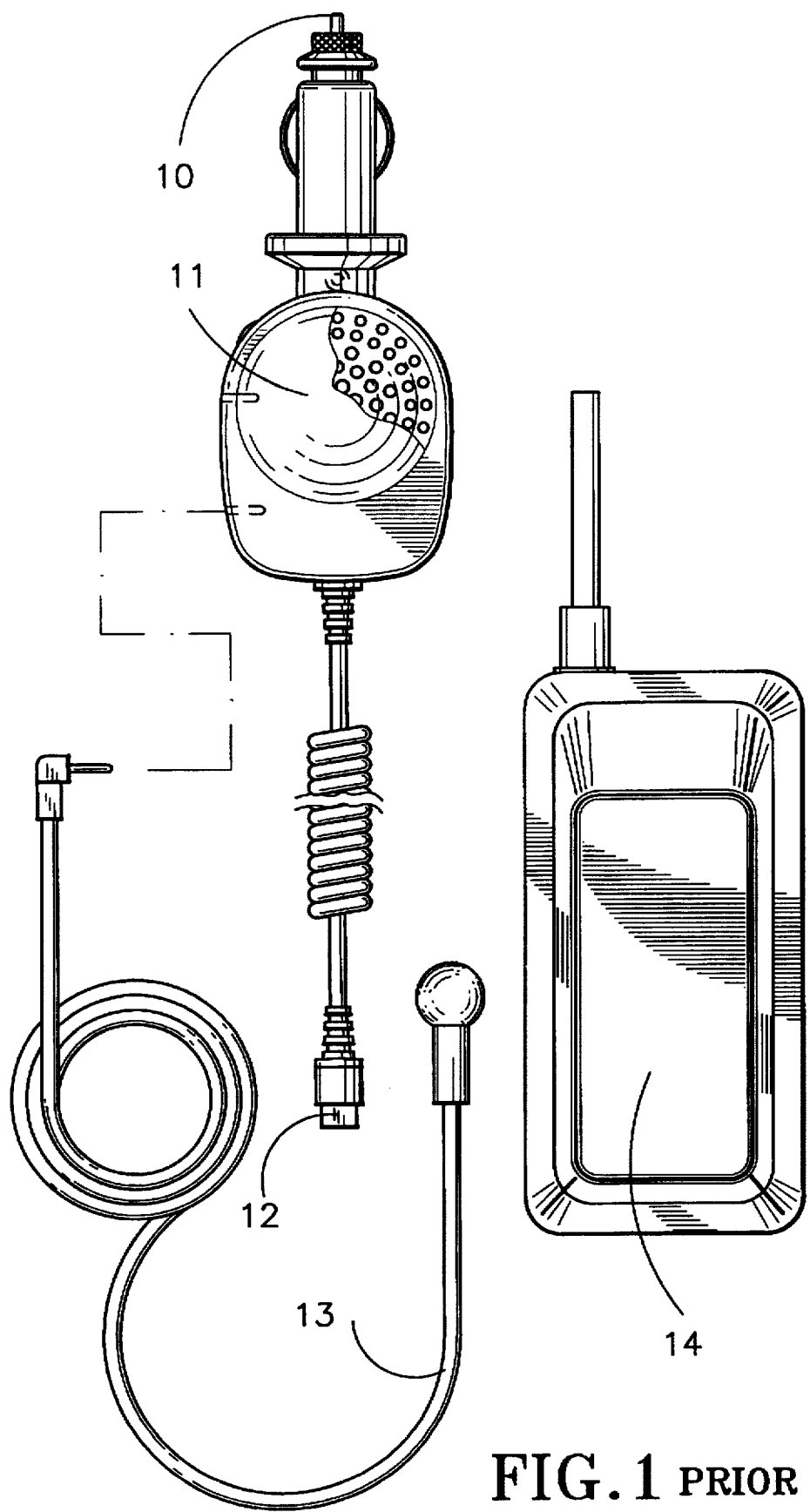
FIG. 1 illustrates a conventional hands-free device which permits hands-free operation of a cellular telephone.

Before the present invention is described in greater detail, it should be noted that like elements are denoted by the same reference numerals throughout the disclosure.

Figure 2:
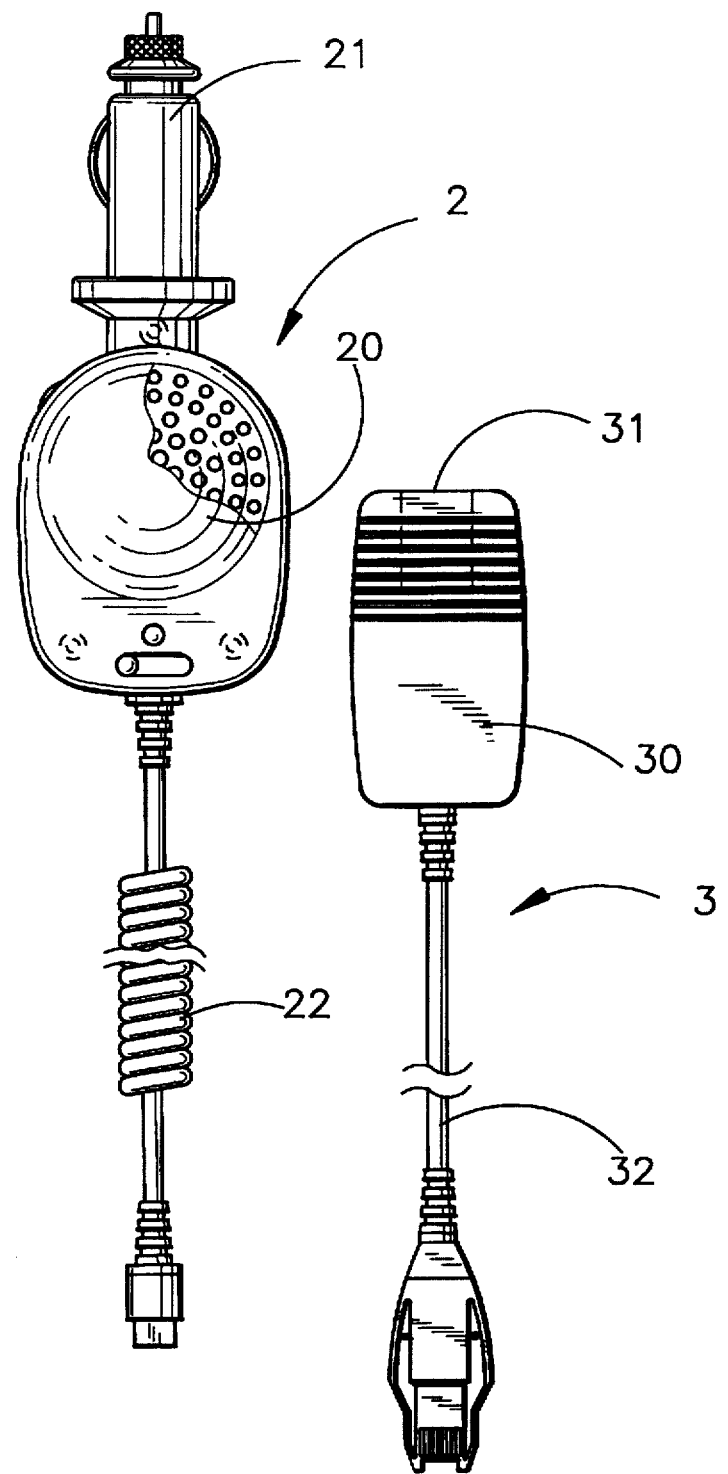
FIG. 2 illustrates a preferred embodiment of a hands-free device which permits hands-free operation of a cellular telephone in accordance with the present invention.
Figure 3:
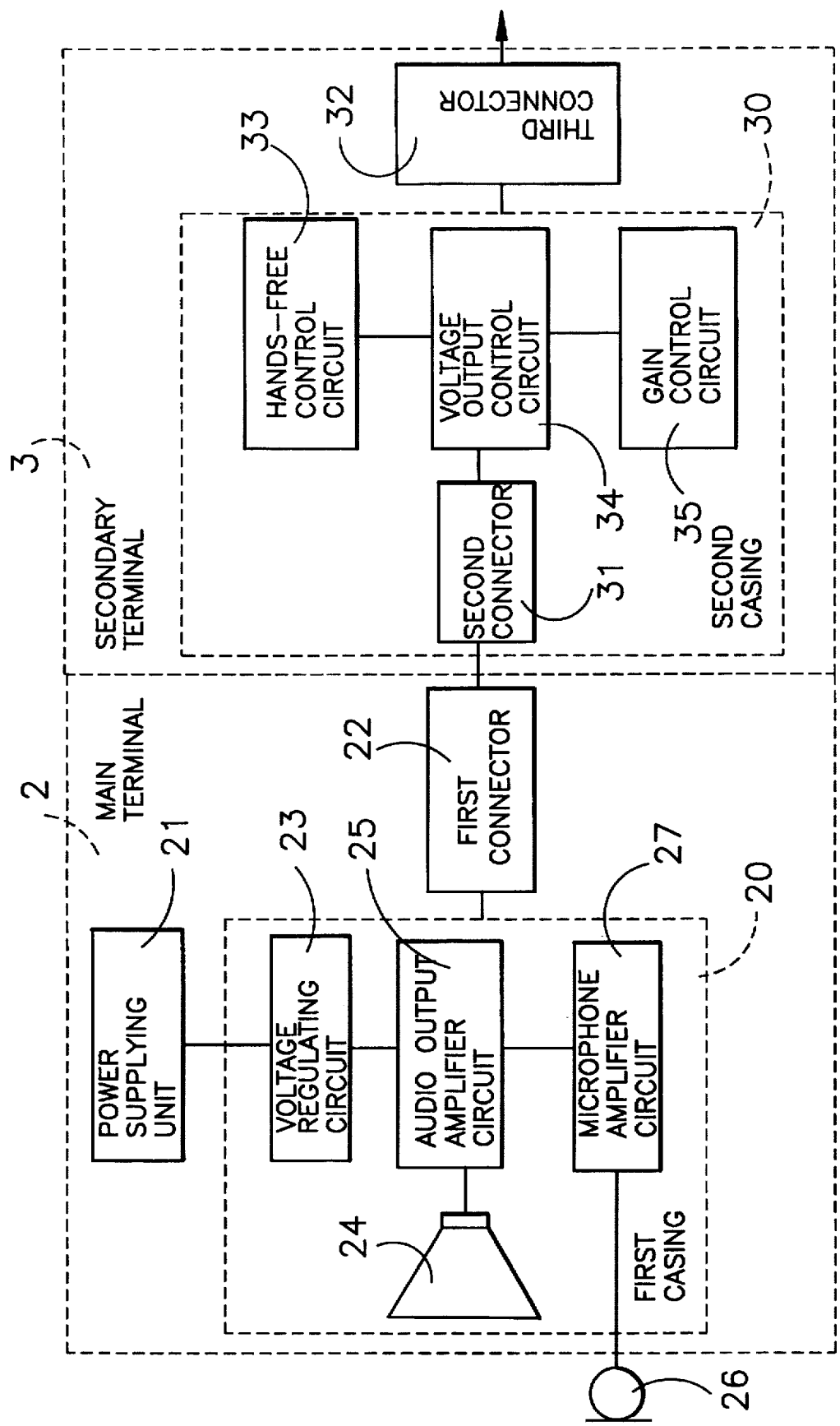
FIG. 3 is a schematic circuit block diagram of the preferred embodiment.

Referring to FIGS. 2 and 3, a preferred embodiment of a hands-free device according to the present invention is shown to comprise a main terminal 2 and a secondary terminal 3.

The main terminal 2 comprises components which do not have to be modified so as to suit a particular type of cellular telephone (not shown). In this embodiment, the main terminal 2 includes a first casing 20, a power supplying unit 21 provided on the first casing 20, and a first connector 22 provided on the first casing 20. A voltage regulating circuit 23, a sound output unit 24, an audio output amplifier circuit 25, and a microphone amplifier circuit 27 are disposed in the first casing 20. In this embodiment, the power supplying unit 21 extends directly from the first casing 20 and is in the form of a plug which is adapted to be inserted into a lighter socket (not shown) of a car for connection with a power source of the latter. The voltage regulating circuit 23 is connected electrically to the power supplying unit 21 and generates a stable voltage signal therefrom. The voltage regulating circuit 23 is connected electrically to the audio output amplifier circuit 25, the microphone amplifier circuit 27 and the first connector 22, and supplies the voltage signal thereto. The audio output amplifier circuit 25 is connected electrically to the first connector 22 and the sound output unit 24. Thus, the sound output unit 24, which includes a loudspeaker that is built into the first casing 20, is capable of reproducing an audio signal received by the first connector 22. The microphone amplifier circuit 27 is further connected electrically to the first connector 22 and to an external microphone 26. As such, the microphone amplifier circuit 27 can amplify voice signals picked up by the external microphone 26 and provide the same to the first connector 22. Preferably, the first connector 22 includes a connecting plug on one end of an elastic cord.

The secondary terminal 3 comprises components which are needed to suit the hands-free device for use with a particular type of cellular telephone. In this embodiment, the secondary terminal 3 includes a second casing 30, and second and third connectors 31, 32 provided on the second casing 30. Preferably, the second connector 31 is formed as a connecting socket on the second casing 30, while the third connector 32 includes a connecting plug on one end of a flexible cord that extends from the second casing 30. The second connector 31 engages removably the first connector 22, whereas the third connector 32 is adapted to be connected removably to the cellular telephone. A hands-free control circuit 33, a voltage output control circuit 34, and a gain control circuit 35 are disposed in the second casing 30. The hands-free control circuit 33 is connected electrically to the third connector 32 and is used to enable or disable hands-free operation of the cellular telephone. The voltage output control circuit 34 is connected electrically to the second and third connectors 31, 32 and serves to adjust the voltage signal received by the first connector 22 from the voltage regulating circuit 23 in order to suit a particular type of cellular telephone. The gain control circuit 35 is connected electrically to the second and third connectors 31, 32 and serves to adjust the level of the incoming audio signal according to the particular type of cellular telephone that is in use prior to supplying the audio signal to the audio output amplifier circuit 25 via the first and second connectors 22, 31.

In use, voice signals picked up by the external microphone 26 are amplified by the microphone amplifier circuit 27 and are supplied to the cellular telephone via the first, second and third connectors 22, 31, 32. Audio signals from the cellular telephone are received by the gain control circuit 35 via the third connector 32 for processing before being supplied to the audio output amplifier circuit 25 via the first and second connectors 22, 31 for reproduction by the sound output unit 24. The voltage signal from voltage regulating circuit 23 is received by the voltage output control circuit 34 via the first and second connectors 22, 31 and is adjusted by the voltage output control circuit 34 into a power signal to be received by the cellular telephone via the third connector 32.

Figure 4:
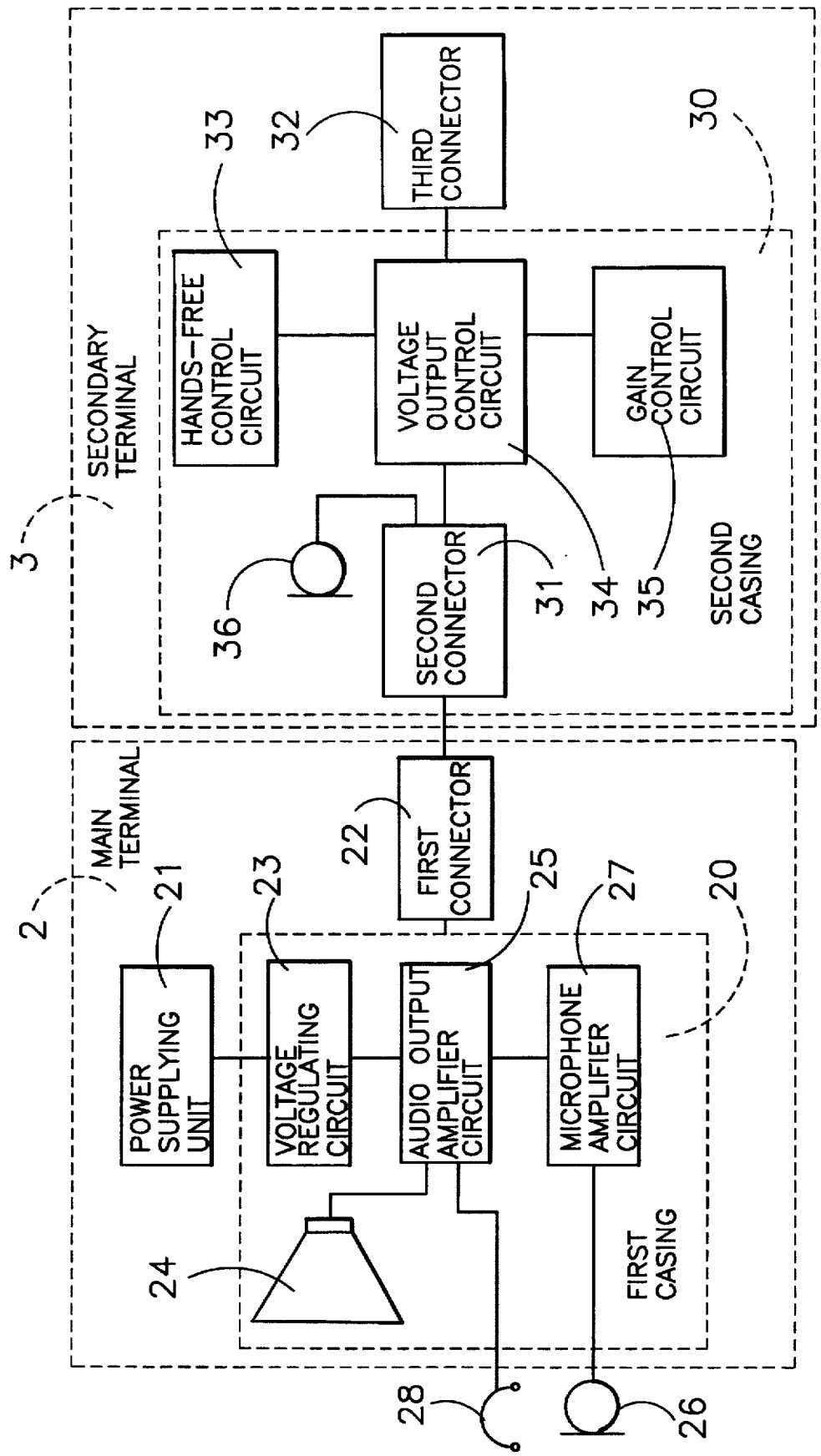
FIG. 4 is a schematic circuit block diagram of a modified embodiment according to the present invention.

FIG. 4 is a schematic circuit block diagram of a modified embodiment according to the present invention. As shown, an external sound output unit 28, such as a headset, may be additionally connected to the audio output amplifier circuit 25, while an internal microphone 36 may be built into the second casing 30 and may be connected to the second connector 31. The sound output unit 28 and the microphone 36 enhance flexibility of the hands-free device of this invention during use.

Figure 5:
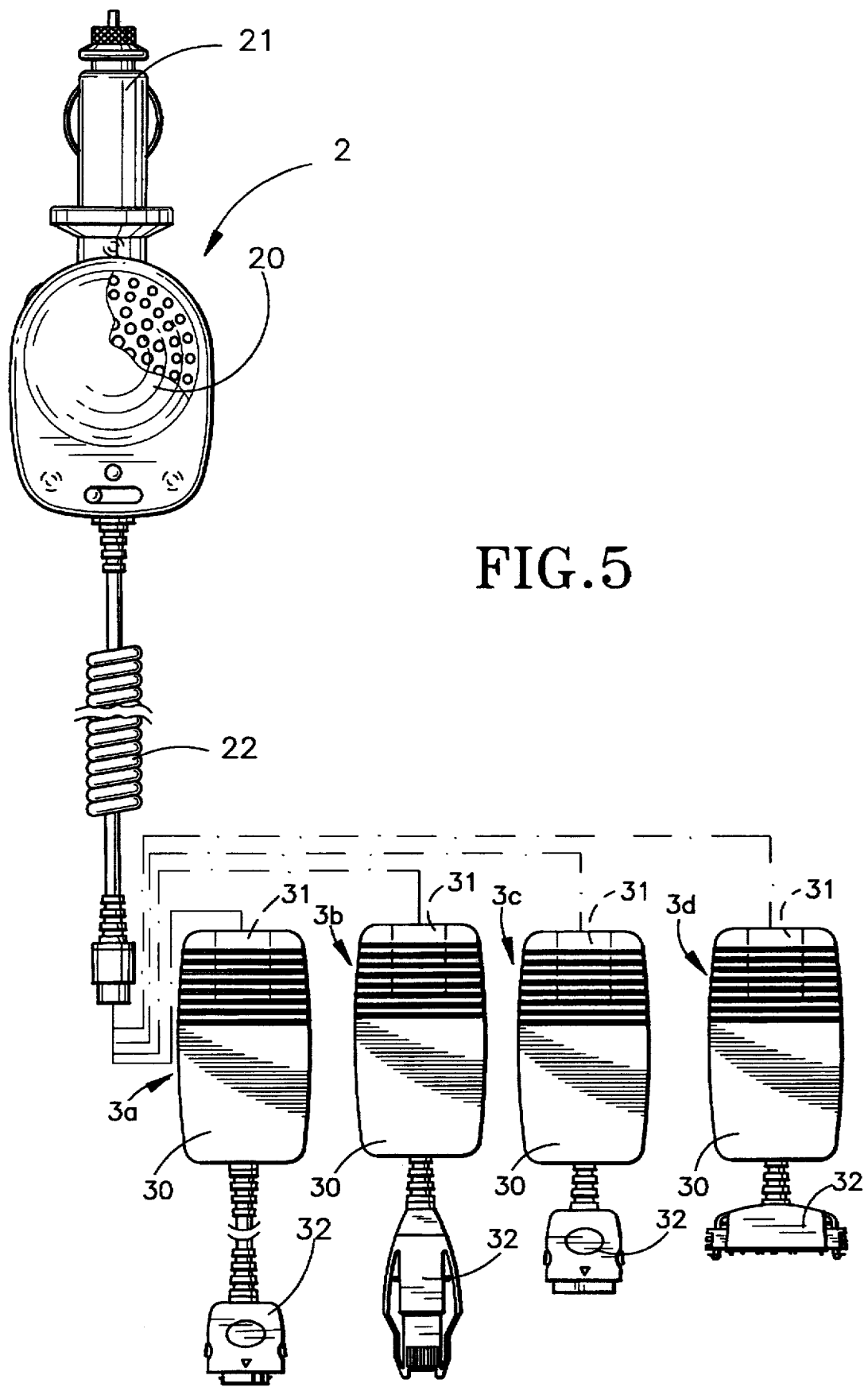
FIG. 5 illustrates a main terminal and different secondary terminals of the hands-free device according to the present invention.

FIG. 5 illustrates the main terminal 2 and different secondary terminals 3a, 3b, 3c, 3d of the hands-free device of this invention. Note that each of the secondary terminals 3a, 3b, 3c, 3d is provided with a specific third connector 32 for connection with a particular type of cellular telephone. Since each type of cellular telephone requires a specific connector and a particular set of operating and control voltages, by simply choosing an appropriate one of the secondary terminals 3a, 3b, 3c, 3d, the hands-free device of the present invention can be used with any type of cellular telephone without changing the main terminal 2.

Figure 6:
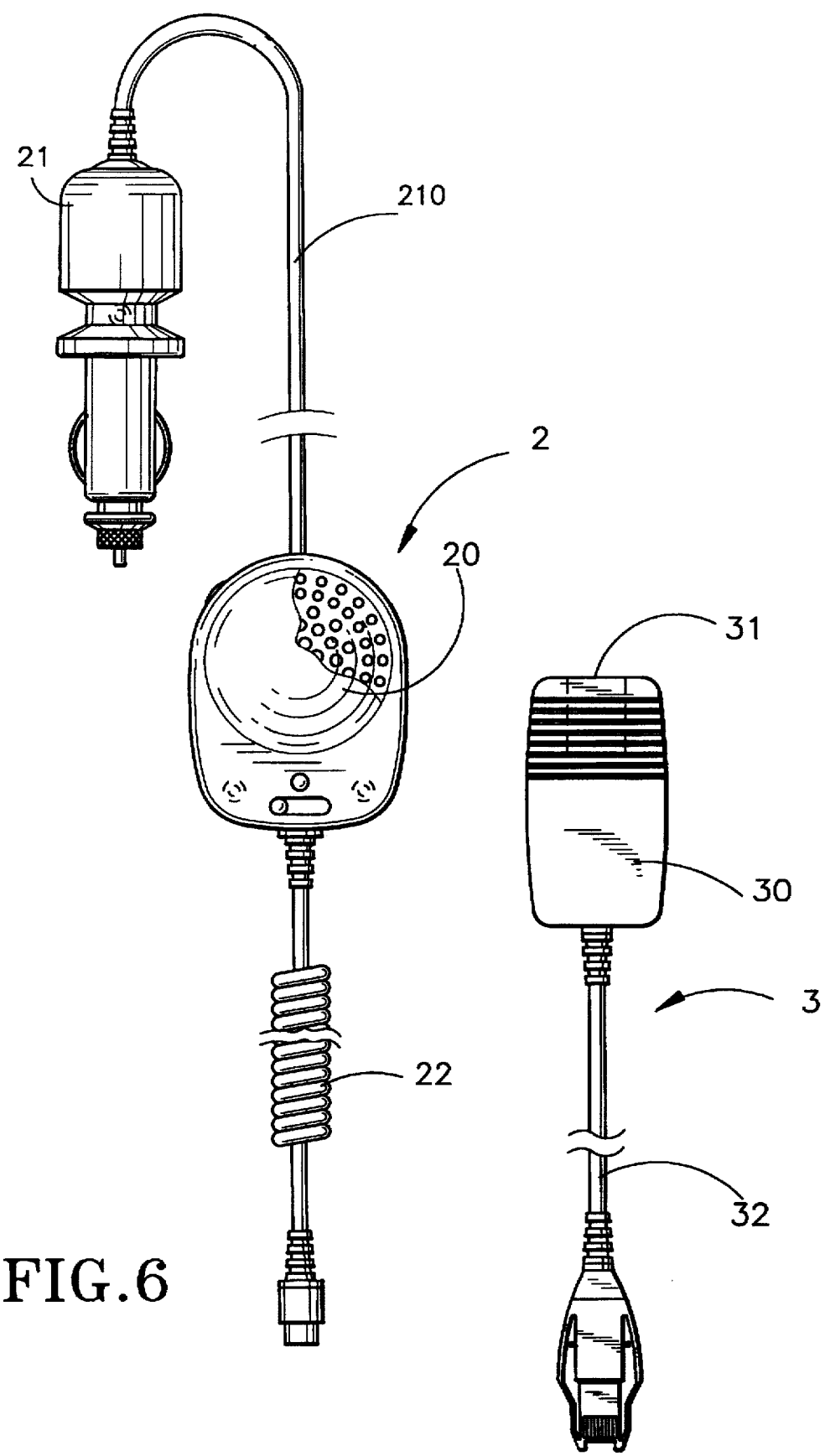
FIG. 6 illustrates another preferred embodiment of a hands-free device according to the present invention.

FIG. 6 shows another preferred embodiment of a hands-free device according to the present invention. As illustrated, the hands-free device of this embodiment is generally similar to the embodiment of FIG. 2 except that, in this embodiment, a cable 210 couples electrically the power supplying unit 21 to the voltage regulating circuit (not shown) in the first casing 20 of the main terminal 2. The operation of this embodiment is similar to that of the previous embodiments and will not be detailed further.

It has thus been shown that the hands-free device of the present invention can be easily configured so as to suit the particular type of cellular telephone that is in use, thereby simplifying production and facilitating maintenance of the hands-free device. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A hands-free device adapted for use with a cellular telephone in a car to permit hands-free operation of the cellular telephone, said hands-free device comprising:
    a main terminal including:
        a first casing;
        a power supplying unit provided on said first casing and adapted to be connected electrically to a power source of the car;
        a voltage regulating circuit disposed in said first casing and connected electrically to said power supplying unit so as to generate a stable voltage signal therefrom;
        a first connector provided on said first casing and connected electrically to said voltage regulating circuit so as to receive said voltage signal therefrom;

an audio output amplifier circuit disposed in said first casing and connected electrically to said voltage regulating circuit so as to receive said voltage signal therefrom, said audio output amplifier circuit being further connected electrically to said first connector for amplifying an audio signal received by said first connector; and a sound output unit connected electrically to said audio output amplifier circuit for reproducing said audio signal from said audio output amplifier circuit;

a secondary terminal including:

a second casing;

a second connector provided on said second casing and connected removably to said first connector;

a third connector provided on said second casing and adapted to connect removably with the cellular telephone;

a hands-free control circuit disposed in said second casing and connected electrically to said third connector, said hands-free control circuit being adapted to control hands-free operation of the cellular telephone;

a voltage output control circuit disposed in said second casing and connected electrically to said second and third connectors, said voltage output control circuit adjusting said voltage signal received by said first connector from said voltage regulating circuit and being adapted to provide said voltage signal to the cellular telephone via said third connector; and a gain control circuit disposed in said second casing and connected electrically to said second and third connectors, said gain control circuit being adapted to adjust level of said audio signal received from the cellular telephone via said third connector prior to supplying said audio signal to said audio output amplifier circuit via said first and second connectors; and a microphone provided on one of said main terminal and said secondary terminal for picking up voice signals to be supplied to the cellular telephone by said secondary terminal.

2. The hands-free device as claimed in claim 1, wherein said microphone is provided on said main terminal, said main terminal further including a microphone amplifier circuit disposed in said first casing and connected electrically to said voltage regulating circuit so as to receive said voltage signal therefrom, said microphone amplifier circuit being further connected electrically to said first connector and to said microphone so as to amplify said voice signals picked up by said microphone and being adapted to provide said voice signals to the cellular telephone via said first, second and third connectors.

3. The hands-free device as claimed in claim 2, wherein said microphone is an external microphone.

4. The hands-free device as claimed in claim 1, wherein said power supplying unit is formed as a plug which is adapted to be inserted into a lighter socket of the car.

5. The hands-free device as claimed in claim 4, wherein said power supplying unit extends directly from said first casing.

6. The hands-free device as claimed in claim 4, wherein said main terminal further includes a cable which couples electrically said power supplying unit to said voltage regulating circuit in said first casing.

7. The hands-free device as claimed in claim 1, wherein said first connector includes a connecting plug on one end of an elastic cord, said second connector including a connecting socket formed on said second casing for engaging removably said connecting plug of said first connector.

8. The hands-free device as claimed in claim 1, wherein said third connector includes a connecting plug on one end of a flexible cord that extends from said second casing.

9. The hands-free device as claimed in claim 1, wherein said sound output unit includes a loudspeaker built into said first casing.

10. The hands-free device as claimed in claim 1, wherein said sound output unit is disposed externally of said first casing.

11. The hands-free device as claimed in claim 1, wherein said microphone is built into said second casing of said secondary terminal and is connected electrically to said second connector so as to be adapted to provide said voice signals picked up thereby to the cellular telephone via said second and third connectors.

* * * * *

(12) EX PARTE REEXAMINATION CERTIFICATE (6453rd)
United States Patent
Hong

(10) Number: US 5,802,167 C1
(45) Certificate Issued: Sep. 30, 2008

(54) HANDS-FREE DEVICE FOR USE WITH A CELLULAR TELEPHONE IN A CAR TO PERMIT HANDS-FREE OPERATION OF THE CELLULAR TELEPHONE

(76) Inventor: Chu-Chai Hong, 2F, No. 83, Min-Chuan Rd., Hsin-Tien City, Taipei Hsien (TW)

Reexamination Request:
No. 90/007,426, Feb. 17, 2005

Reexamination Certificate for:
Patent No.: 5,802,167
Issued: Sep. 1, 1998
Appl. No.: 08/745,493
Filed: Nov. 12, 1996

(51) Int. Cl.
*H04M 1/60* (2006.01)
*H04M 19/08* (2006.01)

(52) U.S. Cl. ............ 379/388.02; 379/390.01; 379/420.02; 379/420.03; 455/569.2
(58) Field of Classification Search .............. None
See application file for complete search history.

(56) References Cited
U.S. PATENT DOCUMENTS 4,339,828 A 7/1982 Chasek
5,191,602 A 3/1993 Regen et al.
5,333,176 A 7/1994 Burke et al.
5,333,177 A 7/1994 Braitberg et al.
5,347,211 A 9/1994 Jakubowski
5,457,814 A 10/1995 Myrskog et al.
5,479,331 A 12/1995 Lenni
5,479,479 A 12/1995 Braitberg et al.
5,535,274 A 7/1996 Braitberg et al.
5,613,222 A 3/1997 Guenther
5,636,110 A 6/1997 Lanni
6,021,207 A 2/2000 Puthuff et al.

*Primary Examiner*—Albert W Paladini

(57) ABSTRACT

A hands-free device is adapted for use with a cellular telephone in a car to permit hands-free operation of the cellular telephone, and includes a main terminal, a secondary terminal, and a microphone provided on one of the main and secondary terminals. The main terminal includes a first casing, a power supplying unit, a voltage regulating circuit, a first connector, an audio output amplifier circuit, and a sound output unit. The secondary terminal includes a second casing, a second connector connected removably to the first connector, a third connector connected removably to the cellular telephone, a hands-free control circuit, a voltage output control circuit, and a gain control circuit. The secondary terminal can be replaced so that the hands-free device can be used with any type of cellular telephone without changing the main terminal.

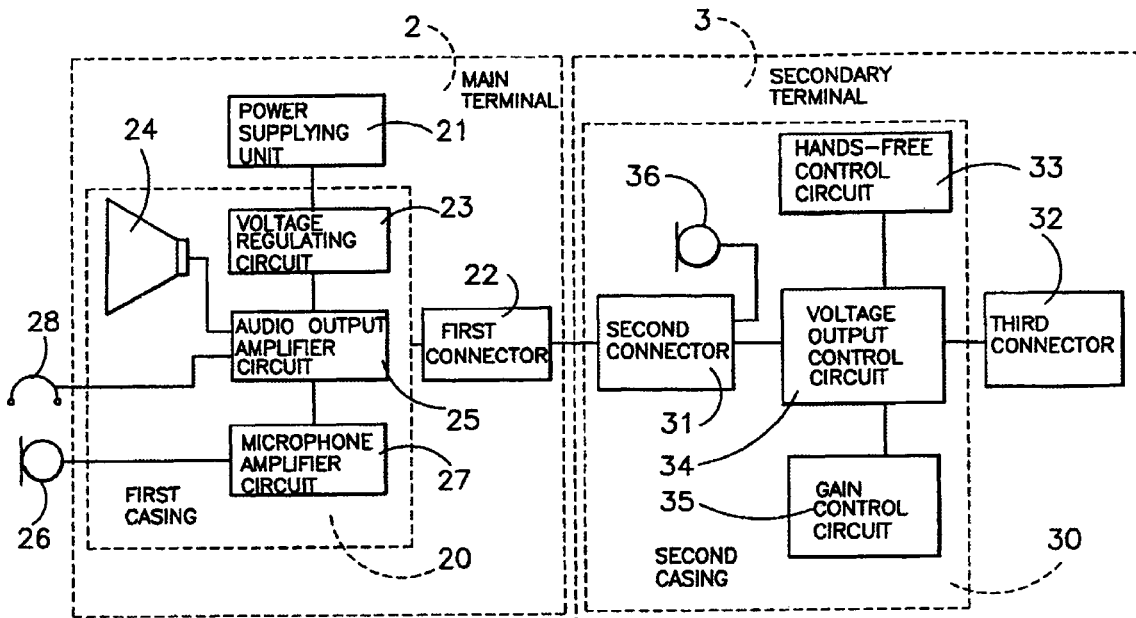

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4 and 11 are determined to be patentable as amended.

Claims 3 and 5–10, dependent on an amended claim, are determined to be patentable.

New claims 12–18 are added and determined to be patentable.

1. A hands-free device adapted for use with a cellular telephone in a car to permit hands-free operation of the cellular telephone, said hands-free device comprising:
   a main terminal including:
     a first casing;
     a power supplying unit provided on said first casing and adapted to be connected electrically to a power source of the car;
     a voltage regulating circuit disposed in said first casing and connected electrically to said power supplying unit so as to generate a stable voltage signal therefrom;
     a first connector provided on said first casing and connected electrically to said voltage regulating circuit so as to receive said voltage signal therefrom;
     an audio output amplifier circuit disposed in said first casing and connected electrically to said voltage regulating circuit so as to receive said voltage signal therefrom, said audio output amplifier circuit being further connected electrically to said first connector for amplifying an audio signal received by said first connector; and
     a sound output unit connected electrically to said audio output amplifier circuit for reproducing said audio signal from said audio output amplifier circuit;
   a secondary terminal including:
     a second casing;
     a second connector provided on said second casing and connected removably to said first connector;
     a third connector provided on said second casing and [adapted to connect] *that is to be* removably *connected* with the cellular telephone;
     a hands-free control circuit disposed in said second casing and connected electrically to said third connector, said hands-free control circuit being adapted to control hands-free operation of the cellular telephone;
     a voltage output control circuit disposed in said second casing and connected electrically to said second and third connectors, said voltage output control circuit adjusting said voltage signal received by said first connector from said voltage regulating circuit *and* [being adapted to provide] *providing said* voltage signal to the cellular telephone via said third connector; and
     a gain control circuit disposed in said second casing and connected electrically to said second and third connectors, said gain control circuit [being adapted to adjust] *adjusts a* level of said audio signal received from the cellular telephone via said third connector prior to supplying said audio signal to said audio output amplifier circuit via said first and second connectors; and
   a microphone provided on one of said main terminal and said secondary terminal for picking up voice signals to be supplied to the cellular telephone by said secondary terminal.

2. The hands-free device as claimed in claim 1, wherein said microphone is provided on said main terminal, said main terminal further [includes] *including* a microphone amplifier circuit disposed in said first casing and connected electrically to said voltage regulating circuit so as to receive said voltage signal therefrom, said microphone amplifier circuit being further connected electrically to said first connector and to said microphone so as to amplify said voice signals picked up by said microphone and [being adapted] to provide said voice signals to the cellular telephone via said first, second and third connectors.

4. The hands-free device as claimed in claim 1, wherein said power supplying unit is formed as a plug which is [adapted] to be inserted into a lighter socket of the car.

11. The hands-free device as claimed in claim 1, wherein said microphone is built into said second casing of said secondary terminal and is connected electrically to said connector so as [to be adapted] to provide said voice signals picked up thereby to the cellular telephone via said second and third connectors.

*12. The hands-free device as claimed in claim 11, wherein said power supplying unit is formed as a plug which is to be inserted into a lighter socket of the car.*

*13. The hands-free device as claimed in claim 12, wherein said power supplying unit extends directly from said first casing.*

*14. The hands-free device as claimed in claim 12, wherein said main terminal further includes a cable which couples electrically said power supplying unit to said voltage regulating circuit in said first casing.*

*15. The hands-free device as claimed in claim 11, wherein said first connector includes a connecting plug on one end of an elastic cord, said second connector including a connecting socket formed on said second casing for engaging removably said connecting plug of said first connector.*

*16. The hands-free device as claimed in claim 11, wherein said third connector includes a connecting plug on one end of a flexible cord that extends from said second casing.*

*17. The hands-free device as claimed in claim 11, wherein said sound output unit includes a loudspeaker built into said first casing.*

*18. The hands-free device as claimed in claim 11, wherein said sound output unit is disposed externally of said first casing.*

\* \* \* \* \*